United States Patent [19]

Nakagawa et al.

[11] Patent Number: 4,865,321

[45] Date of Patent: Sep. 12, 1989

[54] MEMORY CARTRIDGE AND INFORMATION PROCESSOR UNIT USING SUCH CARTRIDGE

[75] Inventors: Katsuya Nakagawa, Kusatsu; Masayuki Yukawa, Kyoto, both of Japan

[73] Assignee: Nintendo Company Limited, Kamitakamatsu, Japan

[21] Appl. No.: 125,780

[22] Filed: Nov. 27, 1987

Related U.S. Application Data

[63] Continuation of Ser. No. 914,011, Oct. 1, 1986, abandoned, and a continuation-in-part of Ser. No. 812,929, Dec. 23, 1985, Pat. No. 4,799,635, and a continuation-in-part of Ser. No. 785,226, Oct. 7, 1985, Pat. No. Des. 294,020, and a continuation-in-part of Ser. No. 900,717, Aug. 27, 1986, Pat. No. 4,763,300.

[30] Foreign Application Priority Data

Oct. 4, 1985 [JP] Japan .................. 60-222198

[51] Int. Cl.$^4$ .................. A63F 9/22
[52] U.S. Cl. .................. 273/85 G; 273/1486; 273/1 E; 273/DIG. 28

[56] References Cited

U.S. PATENT DOCUMENTS

| D. 248,470 | 7/1978 | Talesfore | D14/11 |
|---|---|---|---|
| D. 257,345 | 10/1980 | Levy | D14/2 |
| D. 260,881 | 9/1981 | McKinsey et al. | |
| D. 261,644 | 11/1981 | McKinsey et al. | D14/11 |
| D. 269,087 | 5/1983 | Nishi | D14/1 |
| D. 272,342 | 1/1984 | Cheng | D14/11 |
| D. 274,731 | 7/1984 | Girardi et al. | D14/114 |
| D. 275,095 | 8/1984 | Fang | D14/1 |
| D. 280,322 | 8/1985 | Velinsky | D14/11 |
| 3,859,634 | 1/1975 | Perron et al. | |

(List continued on next page.)

FOREIGN PATENT DOCUMENTS

| 0086395 | 8/1983 | European Pat. Off. . |
|---|---|---|
| 0219980 | 5/1987 | European Pat. Off. . |
| 2736823 | 3/1978 | Fed. Rep. of Germany . |
| 3313802 | 10/1983 | Fed. Rep. of Germany . |
| 2021334 | 11/1974 | United Kingdom . |
| 2134306 | 8/1984 | United Kingdom . |

OTHER PUBLICATIONS

Advanced Video System (AVS), Manufactured by Nintendo Co., Ltd., Kyoto Japan and Nintendo of America, Inc., Redmond, WA.

Family Computer and Cartridge Therefor, Manufactured by Nintendo Co., Ltd., Kyoto, Japan (Exhibits 1-6 attached).

Nintendo Entertainment System (NES), manufactured by Nintendo Co., Ltd. Kyoto, Japan and Nintendo of America, Inc. Redmond, Washington (Exhibits 1-6 attached).

(List continued on next page.)

*Primary Examiner*—Leo P. Picard
*Attorney, Agent, or Firm*—Nixon & Vanderhye

[57] ABSTRACT

A cartridge for a gaming machine includes a case having tapered surface formed along a side edge of the rear face thereof which cooperates with a protrusion in the cartridge receiving tray in the gaming machine main unit to prevent an inverted insertion of the cartridge into the machine. A character ROM, a first semiconductor memory storing a program for determining authenticity of the cartridge and a first microcomputer for executing that program are mounted on a printed circuit board accommodated in the case. The gaming machine includes a picture processing unit generating an image signal based on data from the character ROM, a second semiconductor memory which stores the same program for determining authenticity of the cartridge as the program in the first semiconductor memory, and a second microcomputer identical to the first microcomputer for executing the program stored in the second semiconductor memory. The second microcomputer determines authenticity of the loaded or inserted cartridge. Finally, a protrusion attached to the cartridge loading device in the machine cooperates with a recess in the cartridge case to prevent the loading of a counterfeit cartridge.

22 Claims, 10 Drawing Sheets

U.S. PATENT DOCUMENTS

| | | | |
|---|---|---|---|
| 3,900,170 | 8/1975 | Serizawa . | |
| 3,934,122 | 1/1976 | Riccitelli . | |
| 4,095,791 | 6/1978 | Smith et al. | 273/85 G |
| 4,120,030 | 10/1978 | Johnstone | 364/200 |
| 4,149,027 | 4/1979 | Asher et al. | 174/52 R |
| 4,193,131 | 3/1980 | Lennon et al. . | |
| 4,218,582 | 8/1980 | Hellman et al. | 178/22 |
| 4,218,738 | 8/1980 | Matyas et al. . | |
| 4,239,108 | 12/1980 | Coleman et al. . | |
| 4,268,715 | 5/1981 | Atalla . | |
| 4,281,215 | 7/1981 | Atalla . | |
| 4,283,599 | 8/1981 | Atalla . | |
| 4,295,039 | 10/1981 | Stuckert . | |
| 4,310,720 | 1/1982 | Check, Jr. . | |
| 4,315,101 | 2/1982 | Atalla . | |
| 4,352,492 | 10/1982 | Smith | 273/1 GC |
| 4,386,773 | 7/1983 | Bronstein . | |
| 4,430,728 | 2/1984 | Beitel et al. . | |
| 4,432,067 | 2/1984 | Nielsen . | |
| 4,446,519 | 5/1984 | Thomas | 364/300 |
| 4,459,655 | 7/1984 | Willemin . | |
| 4,471,163 | 9/1984 | Donald et al. | 178/22.08 |
| 4,471,216 | 9/1984 | Herve . | |
| 4,492,582 | 1/1985 | Chang et al. | 273/1 E |
| 4,497,038 | 1/1985 | Diepold-Scharnitzky et al. . | |
| 4,500,879 | 2/1985 | Smith, III et al. | 340/739 |
| 4,523,297 | 6/1985 | Ugon et al. . | |
| 4,575,621 | 3/1986 | Dreifus | 178/22.08 |
| 4,575,622 | 3/1986 | Pellegrini | 235/382 |
| 4,652,990 | 3/1987 | Pailen et al. . | |
| 4,670,857 | 6/1987 | Rackman . | |
| 4,680,731 | 7/1987 | Izumi et al. . | |
| 4,683,553 | 7/1987 | Mollier . | |
| 4,723,121 | 2/1988 | van den Boom et al. . | |
| 4,755,799 | 5/1988 | Romano . | |
| 4,757,468 | 7/1988 | Domenik et al. . | |

OTHER PUBLICATIONS

*Hong Kong Enterprise*, "Floppy Disk Controller", Apr. 1984, p. 104.

Family Computer Cartridge and Packaging and Brochure, Manufactured by Nintendo Co., Ltd., Kyoto, Japan.

Family Computer and Packaging, Manufactured by Nintendo Co., Ltd., Kyoto, Japan.

MEMORY CARTRIDGE AND INFORMATION PROCESSOR UNIT USING SUCH CARTRIDGE

This is a continuation of application Ser. No. 914,011 filed Oct. 1, 1986, now abandoned. This is also a continuation-in-part of application Ser. No. 812,929, filed Dec. 23, 1985, now U.S. Pat. No. 4,799,635. This application is also a continuation-in-part of application Ser. No. 785,226 filed Oct. 7, 1985, now U.S. Pat. No. Des. 294,020 and is also a continuation-in-part of U.S. Ser. No. 900,717, filed Aug. 27, 1986, now U.S. Pat. 4,763,300.

BACKGROUND OF THE INVENTION

1. Field of the Invention

The present invention relates to a cartridge for gaming machine and a gaming machine using the same. More specifically, the present invention relates to a memory cartridge incorporating a memory and an information processing apparatus for operating as a game in accordance with a program stored in the cartridge memory.

2. Description of the Prior Art

For example, a ROM cartridge having a general or common shape and structure is disclosed in the U.S. Pat. No. 4,149,027.

Also, a gaming machine wherein a ROM cartridge is loaded in a gaming machine main unit by so-called front loading is disclosed in the U.S. Pat. No. 4,095,791.

Any mechanism or structure which prevents a so-called reverse insertion and allows only an authentic cartridge to be used is not disclosed at all in either of the above-described prior art systems.

The prior art for preventing a reverse insertion discloses the use of a connector for the cartridge which is shifted from the center of the opening of the cartridge.

In the case where the connector is shifted from the center in the direction of length of the opening, an extra length is required in the direction of length, and accordingly a problem of restricting miniaturization of the cartridge occurs. Also, in the case where the connector is shifted from the center in the direction of thickness of the connector, a built-in printed circuit board is biased up or down in the direction of thickness of the cartridge, and therefore electronic components can be mounted only on one face of the printed circuit board, and accordingly a problem of restricting the degree of integration of the printed circuit board occurs.

SUMMARY OF THE INVENTION

Therefore, a principal object of the present invention is to provide a cartridge for a gaming machine having a novel shape or structure which prevents an inverted insertion and allows only an authentic cartridge to be used.

Another object of the present invention is to provide a gaming machine which uses a novel cartridge for gaming machine.

One aspect of the prsent invention can be broadly summarized as a cartridge for a gaming machine which comprises a case, a side surface including a keying surface cooperating with the front end loading device in the gaming machine to prevent an inverted insertion of the cartridge, an opposing side surface having a configuration in cross section, which when inverted is different from the corresponding cross sectional shape of the other side surface, a printed circuit board accommodated in the case, game information generating means for generating information required for a game, a data processing means mounted on the printed circuit board for executing predetermined data processing to determine authenticity of the cartridge.

A second aspect of the invention can also be summarized as a gaming machine having a main unit adapted to receive a memory cartridge, wherein the cartridge includes a case, a side surface including a keying surface cooperating with a front end loading device in the gaming machine to prevent an inverted insertion of the cartridge, an opposing side surface having a configuration in cross section, which when inverted is different from the corresponding cross sectional shape of the other side surface, a printed circuit board accommodated in the case, game information generating means mounted on the printed circuit board for generating information for a game, a first semiconductor memory mounted on the printed circuit board for storing a program for determining authenticity of the cartridge, and first data processing means for executing the program stored in the first semiconductor memory, while the gaming machine main unit comprises a cartridge inserting portion for receiving the cartridge, a contacting portion formed at the cartridge inserting portion and being able to contact the tapered portion when the cartridge is inserted, display signal generating means for generating a display signal for an image displaying means based on game information from the game information generating means, a second semiconductor memory associated with the first semiconductor memory for storing a program for determining authenticity of the cartridge, and second data processing means having the same performance as that of the first data processing means for executing the program stored in the second semiconductor memory.

When the cartridge is normally inserted with the top surface thereof facing upward, the keying surface formed on the side surface of the case is inserted smoothly without any trouble. On the other hand, when the case is inserted with the bottom surface thereof facing upward, that is, inserted upside down, the inverted keying surface interferes with the front end loading device and prevents the insertion of the cartridge. Furthermore, the data processing means mounted on the printed circuit board determines whether the cartridge is authentic or forged.

In accordance with the present invention, an inverted insertion of the cartridge can be prevented without shifting the connector of the cartridge from the center as in the prior art. Accordingly, in accordance with the present invention, the cartridge can be made smaller and also an inverted insertion of the cartridge can be prevented effectively without reducing the degree of integration of the built-in printed circuit board. Also, in accordance with the present invention, the authenticity of the cartridge is verified by the data processing means. Accordingly, a determination as to whether the cartridge is authentic or forged can be made by cooperative actions of the gaming machine and the cartridge, and the use of any unauthorized cartridges can be excluded.

Thus, in accordance with the present invention, only the authentic cartridge can be used, and thereby copying or forging of programs (software) of the game information generating means in the cartridge or of the gaming machine itself can be prevented reliably, and protection of software is performed more completely.

These objects and object objects, features, aspects and advantages of the present invention will become more apparent from the following detailed description of the embodiments of the present invention when taken in conjunction with accompanying drawings.

DESCRIPTION OF THE PREFERRED EMBODIMENTS

Figure 1A:
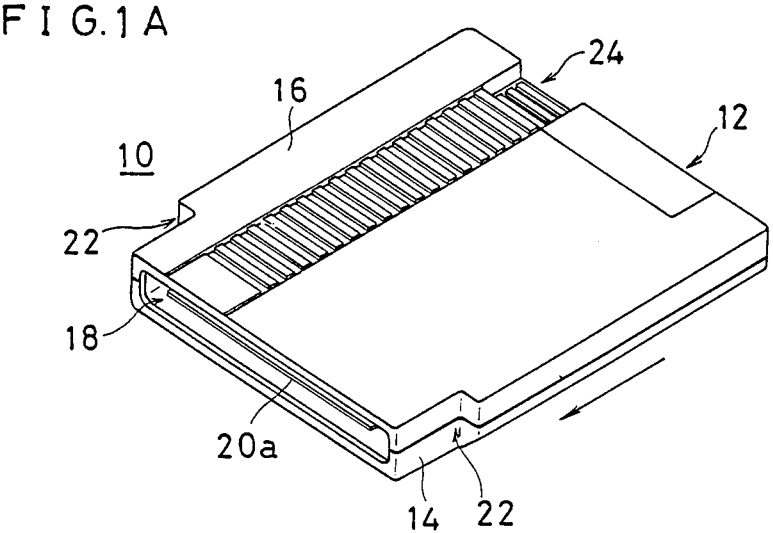
FIG. 1A is a perspective view of one embodiment of a cartridge for a gaming machine in accordance with the present invention.
Figure 1B:
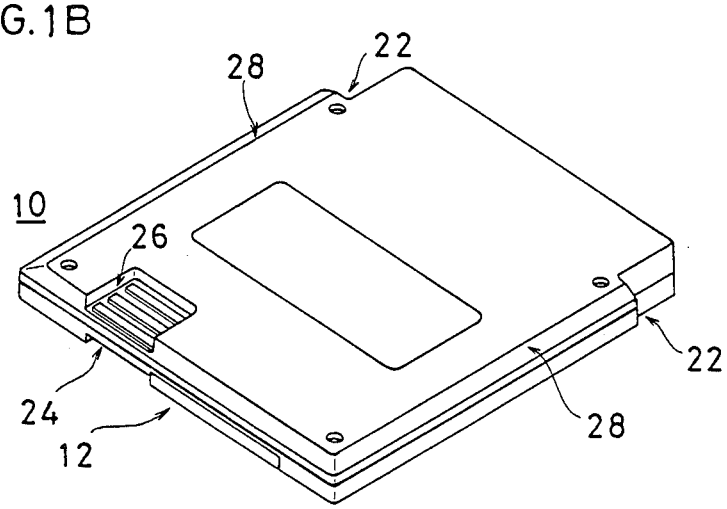
FIG. 1B is a perspective view of the same as viewed from the rear face thereof.

FIG. 1A is a perspective view of a cartridge as viewed from the front surface thereof, and FIG. 1B is a perspective view of the same as viewed from the rear face thereof. A cartridge 10 includes a case 12, and this case 12 includes a lower half 14 and an upper half 16. A rectangular opening 18 is formed at the end of the case 12 in the direction of insertion thereof, and an edge 20a of a printed circuit board accommodated in the case 12 is exposed in that opening 18.

The cartridge 10 is inserted and loaded in a gaming machine main unit 42 as described later (FIG. 3) in the direction as shown by an arrow in FIG. 1A with the upper half 16 facing upward. Then, in the vicinity of the end of the case 12 in the direction of insertion, stepped portions 22 are formed at both side ends thereof. The case 12 is formed in a manner that the width of end portion in the direction of insertion is made narrower and the width of rest behind the same is made wider by these stepped portions 22. A configuration similar to these stepped portions 22 is disclosed, for example, as a "neck portion 25" as shown in FIG. 1 in the U.S. Pat. No. 4,500,879. However, in this embodiment a so-called front loading mechanism is adopted wherein the whole of the cartridge 10 is inserted into the gaming machine main unit 42 (FIG. 3), and therefore, unlike the one in the U.S. Pat. No. 4,500,879, these stepped portions 22 do not define the portion of the cartridge to be exposed beyond the main unit, but act as stops for setting the insertion amount of the cartridge 10, that is, the case 12 to a constant value.

Figure 3:
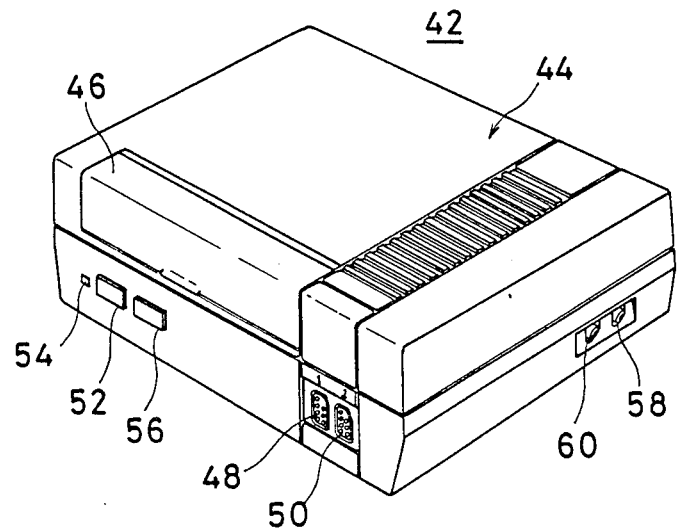
FIG. 3 is a perspective view showing one example of a gaming machine main unit which can be used for a cartridge in accordance with the present invention.

A concave or recess portion 24 is formed at the rear end of the upper half 16 of the case 12 in the direction of insertion, and a concave or recess portion 26 is formed at the corresponding position of the lower half 14. These concave portions 24 and 26 serve as gripping surfaces for the fingers in taking the cartridge 10 out of the gaming machine main unit 42 (FIG. 3.).

The concave portion 26 of the lower half 14 also acts to inhibit the normal loading of any cartridge other than an authentic one into the gaming machine main unit. More specifically, the concave portion 26 of the lower half 16 allows loading of only a specially shaped cartridge wherein a concave portion of a certain depth is formed at the position of the concave portion 26 and prevents normal loading of any cartridge having a shape other than that in cooperation with a cylindrical protrusion 144 as shown if FIG. 6 as described later. Meanwhile, in the illustration, to serve also as a pinch portion, the concave portion 26 is formed so that the area thereof is considerably larger than the tip face of the cylindrical protrusion 144, but the concave portion 26 may be formed in a small notched portion or hold just large enough to allow this protrusion 144 to be inserted. In this case, whether or not the cartridge is adaptable can be distinguished by a positional relationship or shape relationship between the cylindrical protrusion 144 and the notched portion or hole.

As is well understood from FIG. 1B, keying surfaces 28 here provided by a chamfer having a certain inclination are formed at both side ends of the bottom face of the lower half 14. These keying portions 28 are for preventing the so-called reverse insertion, ie, attempted insertion of the cartridge 10 upside down. Then, edge portions having a shape different from the keying surfaces 28 are formed at both sides of the top face of the upper half 16. However, a surface having a different inclination from that of the keying surface 28, such as an edge portion having a smaller radius than the tapered portion 28, or a simple corner portion can be considered. Also, this keying surface 28 and the edge portion corresponding thereto may be formed along only one side of the case.

Figure 2:
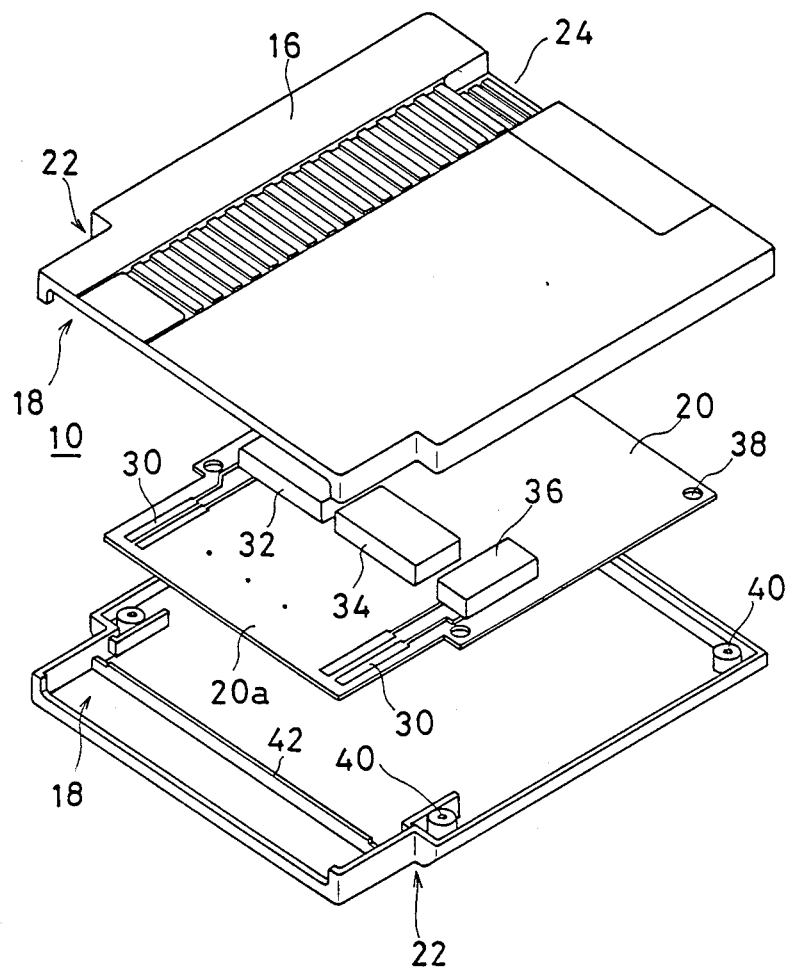
FIG. 2 is an exploded perspective view of the FIG. 1 embodiment.

In reference to FIG. 2, inside the case 12 formed by the lower half 14 and the upper half 16, a printed circuit board 20 is accommodated with a predetermined interval maintained by a spacer 42, and the edge portion 20a of this printed circuit board 20 is exposed to the opening 18 of the case 12. The edge portion 20a of the printed circuit board 20 is positioned inward from the edge face of the opening 18 of the case 12 to prevent that portion from being damaged. On the edge portion 20a, a plurality of connecting electrodes 30 are connected to ROMs 32 and 34 and a microprocessor 36 which are mounted across the width of the printed circuit board 20. The printed circuit board 20 is fixed by inserting screws through a hole 38 formed on the printed circuit board 20 and a hole 40 formed on the lower half 14.

In this embodiment, the ROM 32 functions as a program ROM for storing a program for a game, and the ROM 34 works as a character ROM for generating a character signal or data for the game. The microprocessor 36 functions as data processing means for determining whether or not the gaming machine main unit 42 in which the cartridge 10 is loaded is authentic and hence is allowed to be used. Accordingly, a determination on whether or not the cartridge is authentic is executed by cooperative actions of the microprocessor 36 and a microprocessor 202 of the gaming machine main processor unit 42.

Cartridge 10 is inserted into the gaming machine main unit 24 as shown in FIG. 3. This main unit 42 includes a case 44, and a lid 46 is supported in a manner that permits opening or closing of the front end portion of the top face of this case 44. Then, in the case 44, a front loading apparatus 62 is incorporated, which is described in detail later in reference to FIG. 4 through FIG. 7.

Jacks 48 and 50 are provided on the front face of the case 44, and controllers 194a and 194b (FIG. 10), operated by the user are connected through these jacks 48 and 50. Also, on the lower front face of the case 44, a power switch 52, a light emitting diode 54 for indicating the power switch position and a reset switch 56 are installed. Furthermore, on the right side of the case 44, an external terminal 58 for sound signal and an external terminal 60 for video signal are installed, which provide signals to an image displaying apparatus, for example, a CRT 196 (FIG. 10) from the main unit 42.

Figure 7:
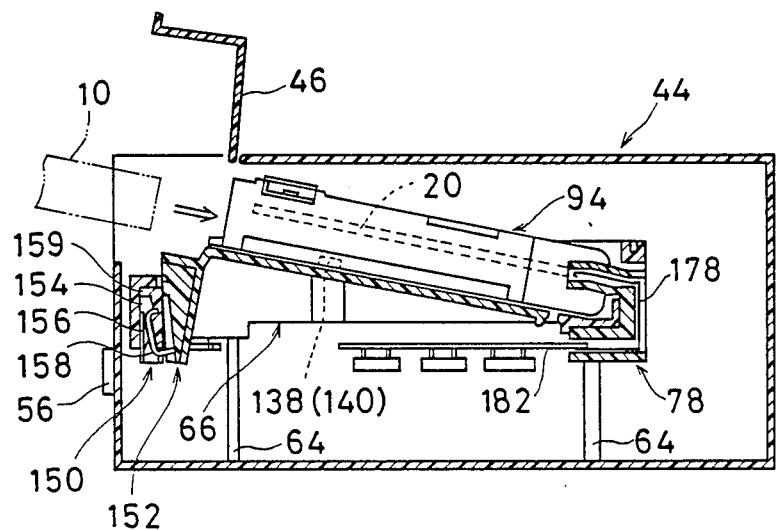
FIG. 7 is an illustrative cross-sectional view taken on line 7—7 in FIG. 5.

The front loading apparatus 62 includes a frame 66 fixed by screws through spacers 64 in the case 44 (FIG. 3) as shown in FIG. 7. As shown in FIG. 7, this frame 66 has a front wall 68 formed in the front thereof and side walls 70 and 72 formed at both sides thereof. These right and left side walls 70 and 72 are connected to connecting portions 74 and 76 at the end portions thereof in the direction of depth. Between these connecting portions 72 and 74, a slender opening 80 is formed so that an opening 170 of an edge connector 78 can be inserted in it.

In the vicinity of the end portions of the side walls 70 and 74 in the direction of insertion of the cartridge 10, L-shaped stepped portions 82 and 84 are formed. Also, brim portions 86 and 88 are formed on the outside faces of the side walls 70 and 72, and mounting holes for fixing this frame 66 to the case 44 are formed in these brim portions 86 and 88.

Figure 5:
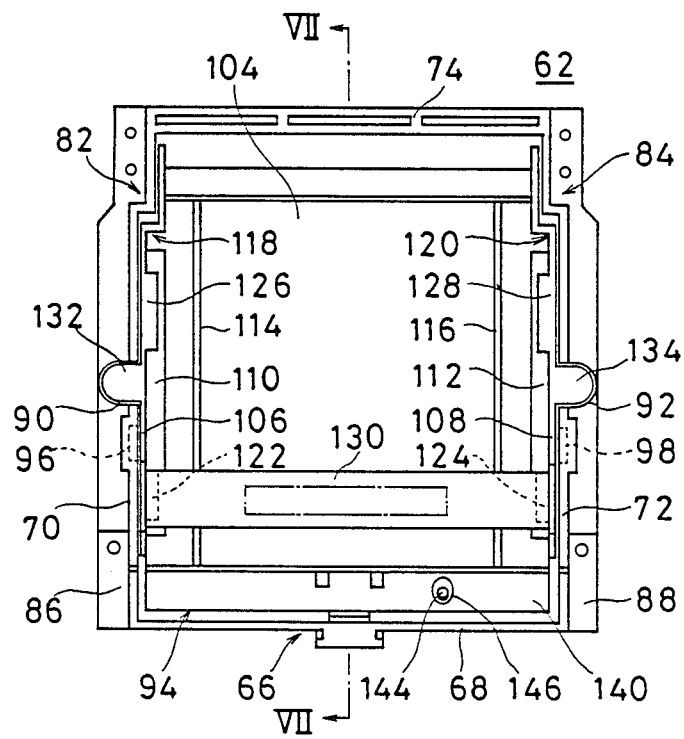
FIG. 5 is a plan view of the front loading apparatus.
Figure 6:
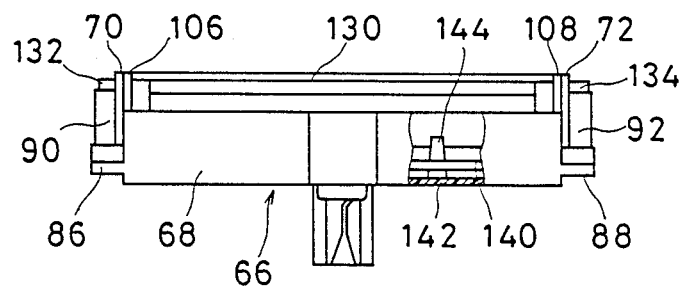
FIG. 6 is a front view of the front loading apparatus.

On the outside faces of the side walls 70 and 72 cylindrical spring shoes 90 and 92 as well understood from FIG. 5 and FIG. 6 are formed. In front of these spring shoes 90 and 92, that is, in the rear thereof in the direction of insertion, engaging grooves 96 and 98 (FIG. 5) for defining the rotation limits of a tray 94 (FIG. 7) as described later are formed on the inner faces of the side walls 70 and 72. These engaging grooves 96 and 98 extend from the bottom ends of the side walls 70 and 72 to a height of nearly two-thirds of the height of the wllls. Then, in the vicinity of the stepped portions 82 and 84 of the side walls 70 and 72, shaft holes 100 for rotatably supporting the tray 94 are formed respectively, and grooves 102 extending from the top end portions of the side walls 70 and 72 to these shaft holes 100 are formed to those positions.

In the frame 66, the tray 94 for holding the inserted cartridge is supported rotatably by a shaft inserted into the shaft holes 100. This tray 94 includes a bottom plate 104 and side walls 106 and 108 formed at both sides of this bottom plate 104. Protruding bars 110 and 112 having a triangular cross-section are fixed to the junction corner portions formed by the bottom plate 104 and the side walls 106 and 108. The inclination of these protruding bars 110 and 112 with respect to the bottom plate 104 corresponds to the inclination of the keying surfaces 28 of the cartridge 10 (FIG. 1B) as described above. Accordingly, the faces of these protruding bars 110 and 112 work as contacting faces with the keying surfaces 28. This means that an inverted insertion of the cartridge 10 is prevented by the keying surfaces 28 and the protruding bars 110 and 112.

On the top surface of the bottom plate 104 of the tray 94, rails 114 and 116 having a rectangular or circular arc in cross-section are disposed in the vicinity of the side end portion extendingly in the direction of insertion of the cartridge 10. These rails prevent the surface of the lower half 14 from being brought in face-contact with the bottom plate 104, thereby serving to reduce the contact resistance. Also, these rails act as reinforcing members of the bottom plate 104.

Stepped portions 118 and 120 corresponding to the stepped portions 82 and 84 of the frame 66 are formed in the side walls 106 and 108. These stepped portions 118 and 120 engage with the stepped portions 22 of the cartridge 10, working to define the amount of insertion of the cartridge 10 at a constant value.

Figure 4:
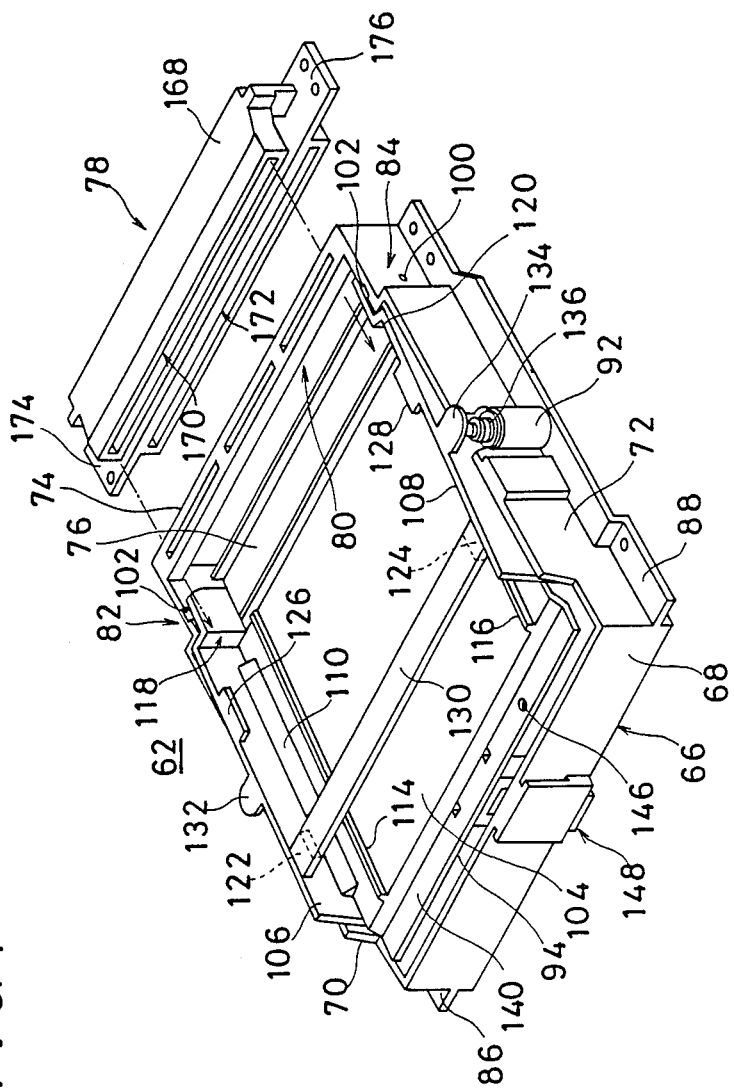
FIG. 4 is a perspective view showing a front loading apparatus in the gaming machine main unit.

As well understood from FIG. 4 and FIG. 5, inwardly protruding pieces 122, 124, 126, and 128 are formed at the top ends of the side walls 106 and 108 of the tray 94. The interval between the bottom end faces of these protruding pieced 122-128 and the top end faces of the rails 114 and 116 is selected equal to or a little larger than the thickness of the case 12 of the cartridge 10. Accordingly, the cartridge 10 is inserted between the rails 114 and 116 and the protruding pieced 122-128. The protruding pieces 122-128 cause the cartridge 10 to move with the tray when it is rotated downward.

A reinforcing plate 130 composed of metal or the like is mounted on a pair of protruding pieces 122 and 124 at the rear end side in the direction of insertion of the cartridge 10. This reinforcing plate 130 presents the bottom plate 104 from warping, and also acts to prevent downward rotation of the tray unless the cartridge is fully inserted.

Furthermore, because the reinforcing plate 130 is composed of a conductive material and connected to frame 66, it acts also as means for preventing electric interference of the cartridge by discharging charges on the case 12. More specifically, when the cartridge 10 is inserted into the tray 94, the surface of the upper half 16 of the case 12 is brought in contact with the reinforcing plate 130. Then, charges on the case 12 are discharged to the electric potential of the frame 66, that is, ground potential through the reinforcing plate 130. Accordingly, electric bombardment to the electronic components 32, 34, 36 and the like mounted on the printed circuit board 20 of the case 12 is prevented, and these electronic components 32, 34, 36 and the like are protected effectively from electrostatic electricity.

On the top end portions of the side walls 106 and 108 of the tray 94, spring stopping pieces 132 and 134 are formed in an outward-protruding fashion at the positions of the spring shoes 90 and 92 installed on the side walls of the frame 66. Coil springs 136 are held between these spring stopping pieces 132 and 134 and the spring shoes 90 and 92, respectively. The tray 94 is rotatably mounted to a shaft (not illustrated) passing through holes 100 and biased upwardly by these coil springs 136. Then, engaging protrusions 138 (FIG. 7) for defining the upper limit of the upward rotation by the springs 136 of the tray 94 are formed on the outside faces of the side walls 106 and 108 facing the engaging grooves 96 and 98.

A stepped portion 140 is formed at the front end of the bottom plate 104 and a hole 146 is formed in this stepped portion 140. Inside the front wall 68 of the frame 66, a holding plate 142 is formed beneath portion 140. A cylindrical protrusion 144 extends upward from plate 142. The outer diameter of the cylindrical protrusion 144 is a little smaller than the inner diameter of hole 146, and the height thereof protrudes beyond the top surface of the bottom plate 104 by a length equivalent to the depth of the concave portion 26 of the cartridge (FIG. 1B). In addition, the cylindrical protrusion 144 is positioned such that when the cartridge 10 is inserted into the tray 94, and the tray 94 is rotated downward into the operating position, the top end of the cylindrical protrusion 144 contacts the bottom of portion 26. Thereby, the normal loading of the cartridge 10 is made possible.

If any cartridge not having the concave portion 26 is inserted, the top end of the cylindrical protrusion 144 will contact the rear face of the cartridge when the tray is rotated downward, preventing loading of the cartridge. Thus, the cylindrical protrusion 144 acts to inhibit loading of any cartridge other than the one having a concave portion substantially identical to concave portion 26.

Furthermore, a locking mechanism 148 is installed in association with the front wall 68 of the frame 66 and the stepped portion 140 of the bottom plate 104 of the tray 94. This locking mechanism 148, as shown in FIG. 7, includes a key mechanism 150 which is provided on the front wall 68 and is equivalent to a key. It also includes a cam mechanism 152 for locking which is provided under the stepped portion 140 and is equivalent to a lock. As shown in FIG. 7, the key mechanism 150 includes an engaging groove 154 formed on rear side of the front wall 68, and a plate spring 156 is fixed to this engaging groove 154. A U-shaped hook pin 158 is forced into contact with the cam mechanism 152 by the plate spring 156, and further a holder 159 fixes the top end of the hook pin 158 and supports the bottom end thereof in a manner capable of swinging.

Figure 8:
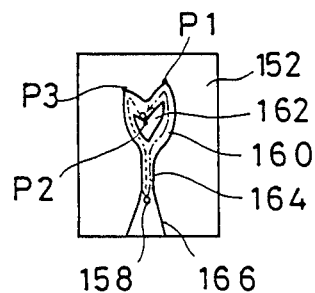
FIG. 8 is an illustrative view showing a locking mechanism.

As shown in FIG. 8, the cam mechanism 152 includes a heart-shaped groove 160 which is a little wider than the thickness of the above-described hook pin 158. An engaging protrusion 162 is formed by an island portion surrounded by this heart-shaped groove 160, and a groove 164 extending downward from the bottom end of the heart-shaped groove 160 is formed, and a trumpet-shaped groove 166 is formed further under the groove 164.

In loading the cartridge 10, the cartridge 10 is inserted into the tray 94, and thereafter this tray 94 is pressed down against the spring force of the coil springs 136 (FIG. 4). At this time, since the top end of the hook pin 158 is fixedly supported by the holder 149, the cam mechanism 152 is guided by the bottom end of the hook pin 158 and the trumpet-shaped groove 166, the groove 164 and the heart-shaped groove 160 at the right side of the engaging protrusion 162. Accordingly, the bottom end of the hook pin 158 is brought to the position shown by a point p1 in FIG. 8. The dash-dot line in FIG. 8 represents the path followed by the bottom end of the hook pin 158 in the heart-shaped groove 160. Thereafter, if the downward force against the tray 94 is relaxed, this tray 94 is restored upward by the elastic force of the coil springs 136 (FIG. 4). Then, the bottom end of the hook pin 158 engages with the U-shaped concave portion at the upper side of the engaging protrusion 162; that is, the portion as shown by a point p2 in FIG. 8. Thereby the tray 94 is retained in the locked state.

On the other hand, when the cartridge 10 is to be removed, the tray 94 is pressed downward again. When the bottom end of the hook pin 158 reaches point p3, the downward force against the tray 94 is relaxed and the bottom end of the hook pin 158 moves along the heart-shaped groove 160 at the left side of the engaging protrusions 162, the groove 164 and the trumpet-shaped groove 166, to the bottom end of this trumped-shaped groove 166. That is, the bottom end of the hook pin 158 moves so as to depict a locus as shown by a dotted line in FIG. 8, and the locked state of the tray 94 is released.

As described above, the cam system locking mechanism 148 of this embodiment first locks the tray 94 at the position of the frame 66 by pressing down the tray 94, and this locking is released by a second pressing, and therefore it is not required to install an additional ejecting mechanism. Accordingly, the configuration of the locking mechanism 148 of the tray 94 can be simplified and miniaturized. Obviously, the configuration may be made in a manner that such a locking mechanism is constituted with a lever or the like, and locking by this lever can be released in interlocking with an operation of an eject button (not illustrated).

As shown in FIG. 4, the opening 170 of the edge connector 78 is engaged with the opening 80 at the front end of the frame 66 in the direction of insertion of the cartridge 10. Case 168 of edge connector 78 has a U-shaped cross section and two vertically spaced openings 170 and 172. The edge portions of printed circuit board 20 and a printed circuit board 182 are inserted into these openings 170 and 172, respectively.

Figure 9:
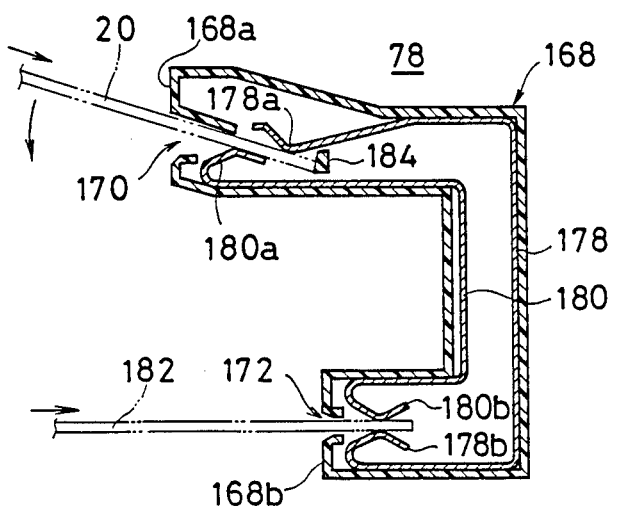
FIG. 9 is an illustrative cross-sectional view showing an edge connector.

To be further detailed, as shown in FIG. 9, the front end of the upper portion of the case 168 protrudes forward beyond the front end of the lower portion thereof, and accordingly the opening 170 is positioned forward beyond the opening 172. Then, the printed circuit board 20 of the cartridge 10 is inserted obliquely into the opening 170. In order to accommodate the circuit boards, upper opening 170 is oriented in the direction of insertion of board 20 whereas lower opening 172 is oriented horizontally as shown.

A number of pairs of spring electrodes 178 and 180 are accommodated in the case 168 and these pairs are uniformly spaced in the direction of width of the edge connector 78. To locate the spring electrodes 178 and 180 in the case, grooves or partitions may be formed on the inner face of the case 168. The respective lower open ends of the spring electrodes 178 and 180 are bent in a V-shape, being formed as contacting portions 178b and 180b which are faced each other.

The upper open end of the spring electrode 178 is bent in a V-shape to form the contacting portion 178a, and the upper open end of the spring electrode 180 is bent outward in a V-shape in the vicinity of the opening 170 and further the tip is bent back in a V-shape, and thereby the contacting portion 180a is formed. The contacting portion 180a and the contacting portion 178a are positioned so as to be spaced from each other in the direction of insertion of the cartridge 10, and when viewed in the direction of insertion of the cartridge 10 (from obliquely above), an interval nearly equal to or a little larger than the thickness of the printed circuit board 20 is kept between them. Then, a stopper protrusion 184 for defining the insertion depth of the printed circuit board 20 is formed under the contacting portion 178a.

In order to load the cartridge it is inserted in the tray until the tip portion 20a (FIG. 2) of the printd circuit board 20 of the cartridge 10 strikes against the stopper protrusion 184. Next the tray and cartridge are rotated downward, pressing circuit board 20 against contact portion 180a which acts as a fulcrum to the position where the printed circuit board 20 becomes parallel with the printed circuit board 182. Thereby the printed circuit board 20 can be loaded easily.

When a game is played using the gaming machine main unit 42 (FIG. 3), first the external terminal 58 for sound and the external terminal 60 for video are connected to the CRT 196 (FIG. 10) such as a home TV set. Thereafter, the lid 46 is opened, and the cartridge 10 is inserted into the tray 94 so that the lower half 14 thereof becomes the down side (FIG. 7). At this time, the stepped portions 22 of the cartridge 20 engage with the stepped portions 118 and 120 of the tray 94, and the amount of insertion of the cartridge 10 is defined. Then, the upper opening 170 of the case 168 of the edge connector 78, that is, the whole of the upper open end 168a fits into the opening 18 (FIG. 1A) of the case 12 of the cartridge 10. In this state, as shown in FIG. 9, the printed circuit board 20 of the cartridge 10 has an inclination of about 10 degrees to printed circuit board 182 of the gaming machine main unit 42. In that position the spring electrodes 178 are not in perfect contact with the contacts 30 of the printed circuit board 20.

Subsequently, the cartridge 10 and the tray 94 are pressed downward from above. When an authentic cartridge is inserted, and the tray 94 is pressed downward, and the locking mechanism 148 locks the tray 94 while holding the same in the horizontal state. Accordingly, the conductive patterns of the printed circuit board 20 are brought into firm electrical contact with the corresponding spring electrodes 178 and 180 in the upper opening 170 of the edge connector 78. Thereafter, the lid 46 (FIG. 3) is closed and the game can be played using the controllers 194a and 194b (FIG. 10).

If any cartridge not having a concave portion analogous to concave portion 26 (FIG. 1B) is inserted into the tray 94, the tray 94 cannot be pressed down because the cylindrical protrusion 144 (FIG. 6) strikes the rear face of the cartridge.

Figure 10:
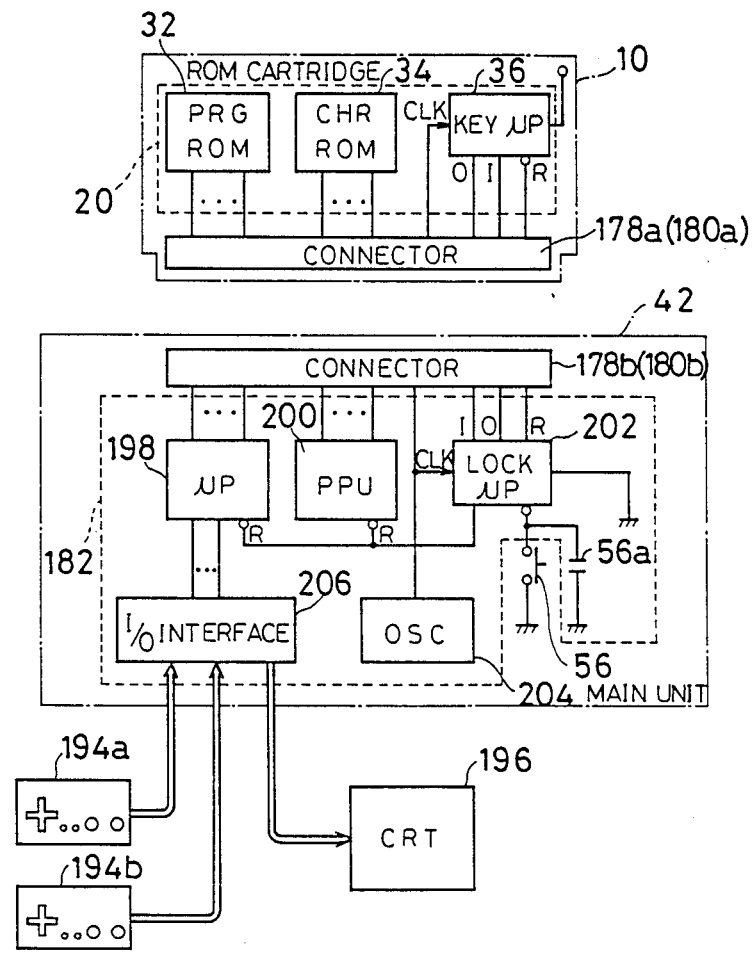
FIG. 10 is a block diagram showing the whole system configuration including the cartridge and the gaming machine main unit.

In reference to FIG. 10, the controllers 194a and 194b are connected to the gaming machine main unit 42 through the jacks 48 and 50 and the CRT 196 is connected through the external terminals 58 and 60 (FIG. 3). Also, the printed circuit board 182 connected by contacting portions 178b and 180b of the above-described edge connector 78 is accommodated in the gaming machine main unit 42. A game microprocessor 198 is mounted on the printed circuit board 182, and the above-described controllers 194a and 194b and the CRT 196 are connected to this microprocessor 198 through an I/O interface 206. A PPU (picture processing unit) 200, a microprocessor 202 for determining authenticity and a clock oscillator 204 are further connected to the printed circuit board 182. The PPU 200 is composed, for example, of the IC "2C03" manufactured by Nintendo and outputs image information processed by the microprocessor 198 as a video signal for the CRT 196.

The microprocessor 202 for determining authenticity preferably is composed of a four-bit microprocessor like the microprocessor for determining authenticity 36 mounted on the printed circuit board 20 of the cartridge 10. The reset switch 56 is connected to the microprocessor 202. A reset condenser 56a is further connected to the reset terminal of the microprocessor 202 in parallel with the reset switch 56. This reset condenser 56a is charged when the power switch 52 (FIG. 3) is turned on, thereby performing so-called initial reset (power on clear) that holds the microprocessor 202 in the reset state for a predetermined time.

As described above, the ROM 32 for storing a program and the ROM 34 for generating character information are mounted on the printed circuit board 20 of the cartridge 10. Then, as shown in FIG. 9, the printed circuit board 20 of the cartridge 10 and printed circuit board 182 of the gaming machine main unit 42 are connected electrically by the edge connector 78. Then, a clock signal from the clock oscillator 204 is given also to the microprocessor for determining authenticity 36 mounted on the printed circuit board 20 of the cartridge 10 through the edge connector 78; that is, the contacting portions 178b, 180b, 178a and 180a.

Figure 11:
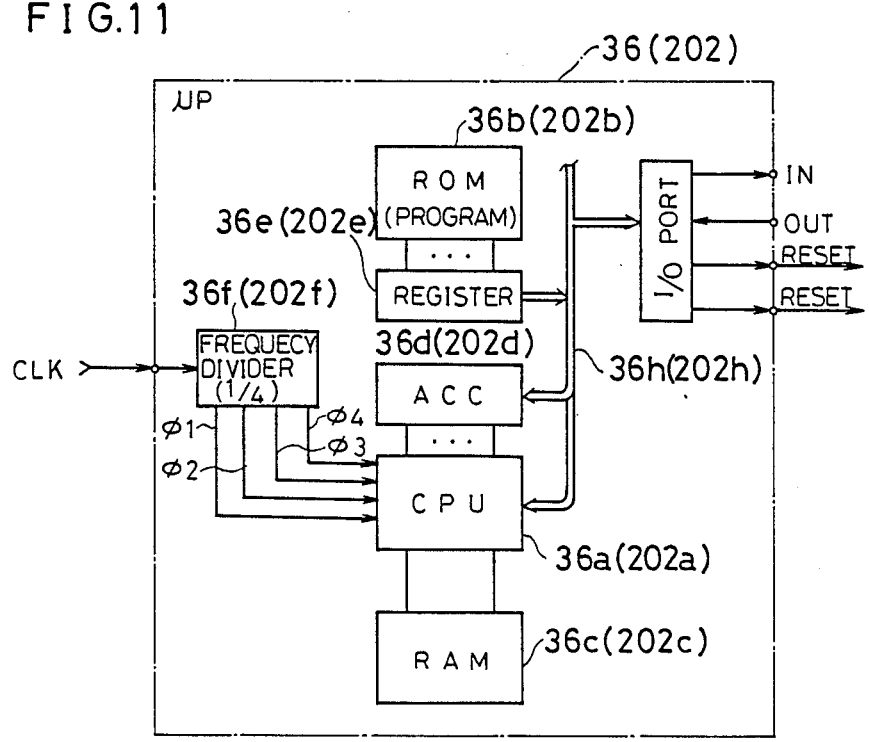
FIG. 11 is a block diagram showing a circuit configuration of a key microprocessor.

Next further detailed description is made of the microprocessor 36 for determining authenticity in reference to FIG. 11. In addition, the microprocessor 202 of the gaming machine main unit side is of a similiar configuration, and therefore in FIG. 11, reference symbols relating thereto are shown in parentheses, and duplicate description is omitted here.

As described above, the microprocessors 36 and 202 determine whether the cartridge 10 is authentic or forged in cooperation with each other. The functions of these two microprocessors 36 and 202 can be compared to the relation between a key and a lock. Accordingly, in the following description, the microprocessor 36 is referred to as the key microprocessor and the microprocessor 202 is referred to as the lock microprocessor.

As shown in FIG. 10, a predetermined terminal of the lock microprocessor 202 is grounded, while a predetermined terminal of the key microprocessor 36 is connected to a power source Vcc. Thereby, the microprocessors 36 and 202 can determine whether they themselves function as a key or a lock.

In the key microprocessor 36 and the lock microprocessor 202, corresponding terminals I, O and R are connected respectively through the edge connector 78 to give and receive data therebetween. Also, as described above, a clock signal CLK from the common clock oscillator 204 is given to these two microprocessors 36 and 202. The microprocessors 36 and 202 operate in the state that respective operation periods and phases are perfectly synchronized.

In reference to FIG. 11, the key microprocessor 36 is preferably of four-bit configuration, and this microprocessor 36 comprises a CPU 36a as data processing means, a ROM 36b as a semiconductor memory, and a RAM 36c for storing various data required for data processing of the CPU 36a. The ROM 36b stores operation programs of the CPU 36a, and these operation programs comprise two arithmetic operation programs. One of the arithmetic operation programs contains a plurality of kinds of arithmetic operation formulas and data of random numbers for arithmetic operation. Also, the operation programs contains a determining program for comparing and checking the result of operation of the other arithmetic operation program against that of the lock microprocessor 202 and a determining program of one arithmetic operation against that of the key microprocessor 36. When these determining programs are executed, the CPU 36a functions as determining means.

Furthermore, the operation programs contain a controlling program for controlling the reset or release of reset state of the gaming machine main unit 42 based on the result of determination by the above-described determining program.

An accumulator 36d is connected to the CPU 36a. On the other hand, a register 36e is connected to the ROM 36b. The register 36e is for temporary storing the program data accessed from the ROM 36b. The CPU 36a, the accumulator 36d and the register 36e are connected by a data bus 36h. This data bus 36h is connected to an I/O port 36g. Through this I/O port 36g, data is outputted to the lock microprocessor 202, and data from that microprocessor 202 is received.

Furthermore, in the key microprocessor 36, a frequency divider 36f for receiving the clock signal CLK from the clock oscillator 204 (FIG. 10) and for frequency dividing the same in installed, and the frequency dividing ratio of the frequency divider 36f is selected, for example, at one-fourth.

Figure 12:
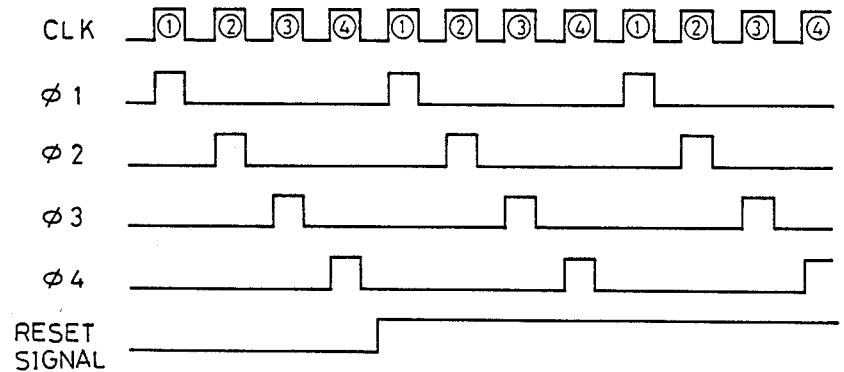
FIG. 12 is a timing chart showing operation in FIG. 11.

Next, brief description is made on operation of the frequency divider 36f in reference to a timing chart in FIG. 12. As described above, the frequency divider 36f makes a ¼ frequency-division of the clock signal CLK from the clock oscillator 204. Accordingly, four signals having different phases o1, o2, o3 and o4 are obtained from the frequency divider 36f. These signals o1–o4 are given to the CPU 36a. The CPU 36a performs predetermined sequential operations synchronized with these four signals o1–o4. For example, it reads data from the I/O port 36g synchronized with the signal o1, performs a predetermined arithmetic operation processing (data processing) synchronized with the signals o2 and o3, and outputs data from the I/O port 36g synchronized with the final signal o4.

In addition, these signals o1–o4 are given also to the lock microprocessor 202, and accordingly the two microprocessors 36 and 202 operate in perfect synchronization. The architectures and the numbers of steps of the operation programs are the same as are the clock signals and hardware, so respective machine cycles coincide completely.

Figure 13:
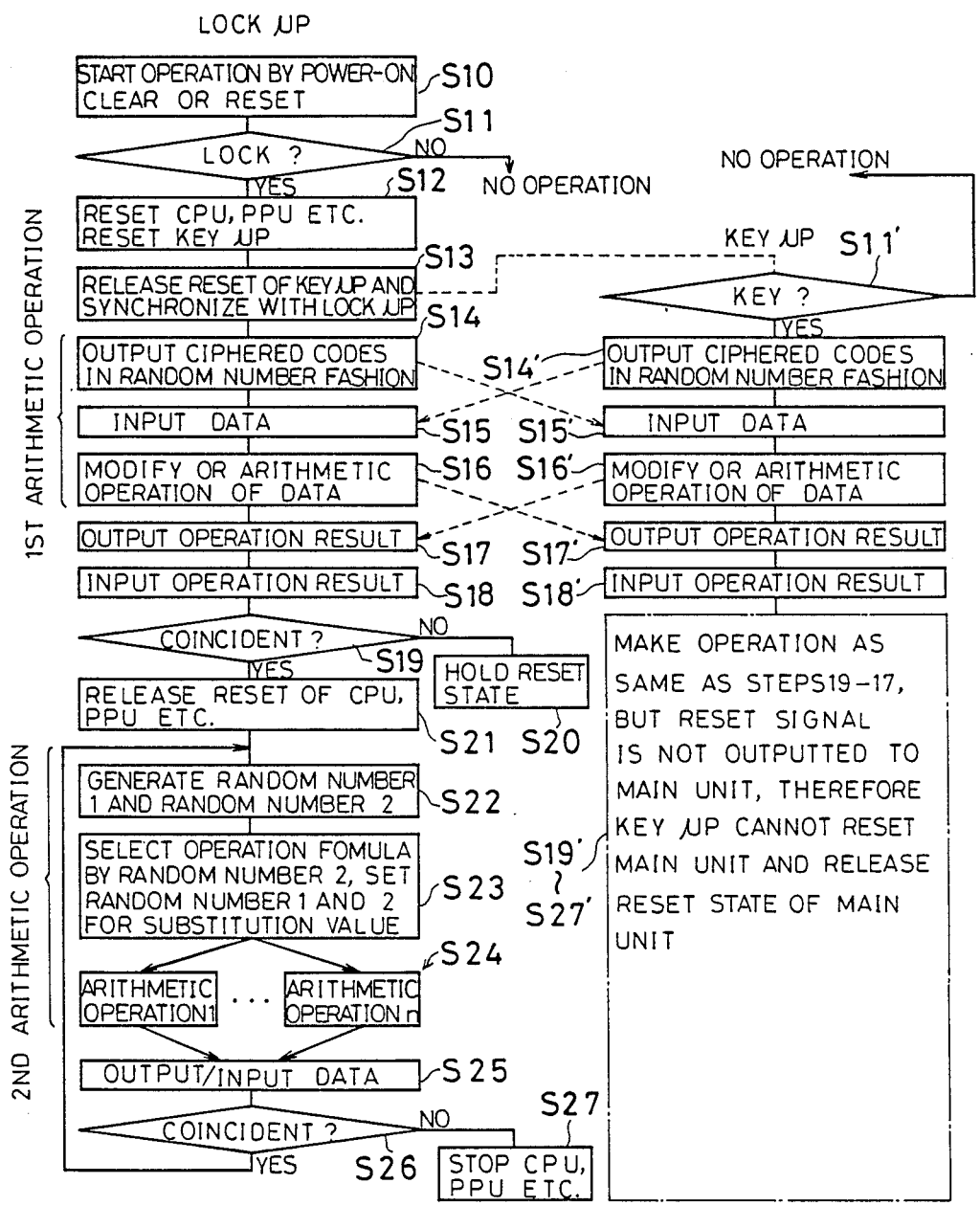
FIG. 13 is a flowchart showing operations of the embodiment shown in FIG. 10 and FIG. 11.

In reference to FIG. 13, after the cartridge 10 is loaded in the gaming machine main unit 42, and the main unit power switch 52 or the reset switch 56 is turned on, a reset operation of the lock microprocessor 202 is performed. In step S10, lock microprocessor 202 starts to operate.

In the following step S11, the lock microprocessor 202 determines whether it is to function as a lock or to function as a key. As explained with reference to FIG. 10, this determination is made by determining whether the predetermined terminal is grounded or connected to the power source. In this case, the microprocessor lock 202 should determine that it is to function as a lock. If it determines that it is to function as a key, for example, due to wrong wiring, malfunction or the like, it is put in the unstable state, not performing any operation.

When "YES" is determined in step S11, in step S12, the lock microprocessor 202 resets each circuit so that the gaming machine main unit 42 does not execute the game program, and this reset state is continued. More specifically, the CPU 198 and the PPU 200 (FIG. 10) are placed in the reset state and disabled until the reset is released in step S21 as described later. Also, in this step S12, the key microprocessor 36 is reset.

In the following step S13, the lock microprocessor 202 releases the reset of the key microprocessor 36, and synchronizes the two microprocessors 36 and 202. More specifically, the machine cycle of the lock microprocessor 202 is set so that the reset signal given to the key microprocessor 36 from the lock microprocessor 202 is outputted between a signal of a specific period of the clock signal CLK, for example, o4 and the signal o1 of the next period. Consequently, the key microprocessor 36 is sure to start operation with that signal o1. Accordingly, the key microprocessor 36 starts operation with the same machine cycle as that of the lock microprocessor 202. Thereby, the two microprocessors 36 and 202 are synchronized, and thereafter the respective microprocessors perform operations in a perfectly synchronized state.

When the reset of the key microprocessor 36 is released in step S13, the key microprocessor 36 determines whether it is to function as a lock or a key in the next step S11'. In this step S11' a determination is made whether the terminal of the key microprocessor 36 is grounded or connected to the power source similar to the above-described determination made in step S11. When "NO" is determined in the step S11', an unstable state takes place and no operations are performed at all. When "YES" is determined in step S11', operations in step S14' and following steps are executed.

On the other hand, the lock microprocessor 202 executes step S13 and thereafter executes operations in step S14 and following steps. Thereafter, in the lock microprocessor 202 and the key microprocessor 36, the same operations can be performed in synchronization, that is, in coincidence in the time axis.

First, in step S14'; the lock microprocessor 202 and the key microprocessor 36 output ciphered codes in a random number fashion from respective program ROMs 202b and 36b (FIG. 11) (steps S14 and S14'). These outputs of ciphered codes are performed using the same random function. Then, conditions given to the random function are the same for the two microprocessors 36 and 202. Accordingly, when the cartridge is authentic, the ciphered codes generated in the key microprocessor 36 become identical.

Next, in steps S15 and S15', the lock microprocessor 202 and the key microprocessor 36 exchange data and receive the ciphered codes generated by the counterportion, respectively. Then, in steps S16 and S16', the both perform predetermined data processings based on the ciphered codes inputted fro mthe counterportions. Arithmetic operation formulas used for these arithmetic operation processings are identical in the two microprocessor 36 and 202, and therefore when the inputted ciphered codes are the same, the results of these arithmetic operation are identical. Then, in steps S17 and S17', the lock microprocessor 202 and the key microprocessor 36 send the result of arithmetic operation to the counterportion, respectively. Responsively, in steps S18 and S18', the two microprocessors 36 and 202 receive the result of arithmetic operation inputted from the counterportion, respectively. Here, since the key microprocessor 36 and the lock microprocessor 202 perform the same operation at the same timing, the results of arithmetic operations inputted from the counterportion are to be inputted at the same timing. Accordingly, in this embodiment, not only coincidence in the result of arithmetic operation but also coincidence in the time axis are taken into consideration to determine whether or not the cartridge is authentic.

Next, in step S18, the lock microprocessor 202 compares and checks the result of arithmetic operation done by itself against the result or arithmetic operation given from the key microprocessor 36, determining whether or not both coincide with each other. As a result of this check, if "NO" is determined, the lock microprocessor 202 holds the reset state of each circuit in the gaming machine main unit 42, namely, the CPU 198, the PPU 200 and the like in the next step S20. Thereby, the gaming machine main unit 42 is inhibited to execute the game program.

In addition, in place of such a holding of the reset state, an alarm may be raised in response to a determination of noncoincidence, or processing may be returned to the initial state, namely, step S11.

As a result of checking in step S19, if "YES" is determined, the lock microprocessor 202 releases the reset state of these circuits, that is, the CPU 198, the PPU 200 and the like in the next step S21.

Subsequently, in step S21, the lock microprocessor 202 generates two sets of random numbers based on a predetermined random function. Then, in step S23, the lock microprocessor 202 selects the kind of arithmetic operation formula by the second set of random numbers, and uses the two sets of random numbers as values to be substituted into the selected arithmetic operation formula. More specifically, in this embodiment, n (a positive integer) kinds of arithmetic operation formulas are set in advance as the second arithmetic operation processing (data processing) in the arithmetic operation program and an arithmetic operation formula is selected from among them in response to the second data of random numbers. Next, in step S24, arithmetic operation by the two sets of random numbers is executed based on the selected arithmetic operation formula. These operations in steps S19–S24 are performed also in the key microprocessor 36 in the same manner at quite the same timing. Then, the random function for generating the two sets of random numbers employed here is also the same as that employed in the lock microprocessor 202. Then, conditions given to the random function for generating the two sets of random numbers are quite the same for the lock microprocessor 202 and the key microprocessor 36. Accordingly, if the cartridge 10 is compatible with the main unit 42, the same arithmetic operation formula is selected, and the results of the arithmetic operation also be the same.

Next, in step S25, the lock microprocessor 202 gives the result of arithmetic operation performed in step S24 to the key microprocessor 36, and receives the result of arithmetic operation by the key microprocessor 36. The same operation is performed also in the key microprocessor 36.

Next, in step S26, the lock microprocessor 202 compares and checks the result of arithmetic operation by itself against the result of the arithmetic operation received from the key microprocessor 36, and determines whether or not they both coincide.

If the cartridge 10 loaded in the gaming machine main unit 42 is not authentic, the result of arithmetic operation by the both do not coincide, and therefore the lock microprocessor 202 forcedly puts the CPU 198, and PPU 200 and the like in the reset state so as to stop the following operations in step S27.

On the other hand, in the lock microprocessor 202, when the result of arithmetic operation by itself and the result of arithmetic operation received from the key microprocessor 36 coincide, processing returns again to step S22, thereafter repeating the operations in steps S22–S26. This means that, in this embodiment, the second arithmetic operation program is executed as long as the gaming machine main unit 42 operates, but if a noncoincidence takes place even once during operations, the step S27 is executed, and operations of the CPU 198 and the PPO 200 are stopped. Thereby, execution of the game program in the main unit 42 is inhibited.

Meanwhile, the same operations as in step S26 ans S27 are performed also in the key microprocessor 36. However, the key microprocessor 36 has no effect on reset and release of reset of each circuit of the gaming machine main unit 42.

Also, for the operation of the key microprocessor 36, because terminals for chip selection are installed normally in the ROMs 32 and 34, it is also possible that these terminals are disabled and thereby the microprocessor 198 and the PPU 200 of the gaming machine main unit 42 side are made inaccessible.

Although a sufficient determination of authenticity can be made by checking the result of the first arithmetic operation in step S19, in the above-described embodiment, the second arithmetic operation and checking of the result thereof are further performed in steps S22–S26 continuously as long as the gaming machine main unit 42 operates. Therefore the determination of whether or not the cartridge 10 is authentic can be made with a high degree of certainty. Accordingly, when any cartridge which copies the ROMs 32 and 34 in the cartridge 10 or comprises ROMs storing programs similar thereto is used, such a protection for software cannot be broken unless hardware identical to the key microprocessor 36 is obtained. Also, by using custom ICs as the key microprocessor 36 and the lock microprocessor 202, such a protection can be made more completely.

Thus, with the cooperation of microprocessor 26 in the cartridge and microprocessor 202 in the gaming machine main unit 42, the software of the cartridge 10 can be protected completely. Accordingly use of any cartridge other than an authentic one is prevented.

In accordance with the present invention, by means of a peculiar shape of the cartridge 10 and by the data processing means accommodated in the cartridge 10, whether or not the cartridge is authentic can be determined perfectly, and thereby use of any cartridge other than the authentic one can be excluded.

In addition, the cartridge 10 in accordance with the present invention may be used with other gaming machines having an inserting port adapted to receive the cartridge where the cartridge is inserted from the upper portion of the main unit.

Figure 14:
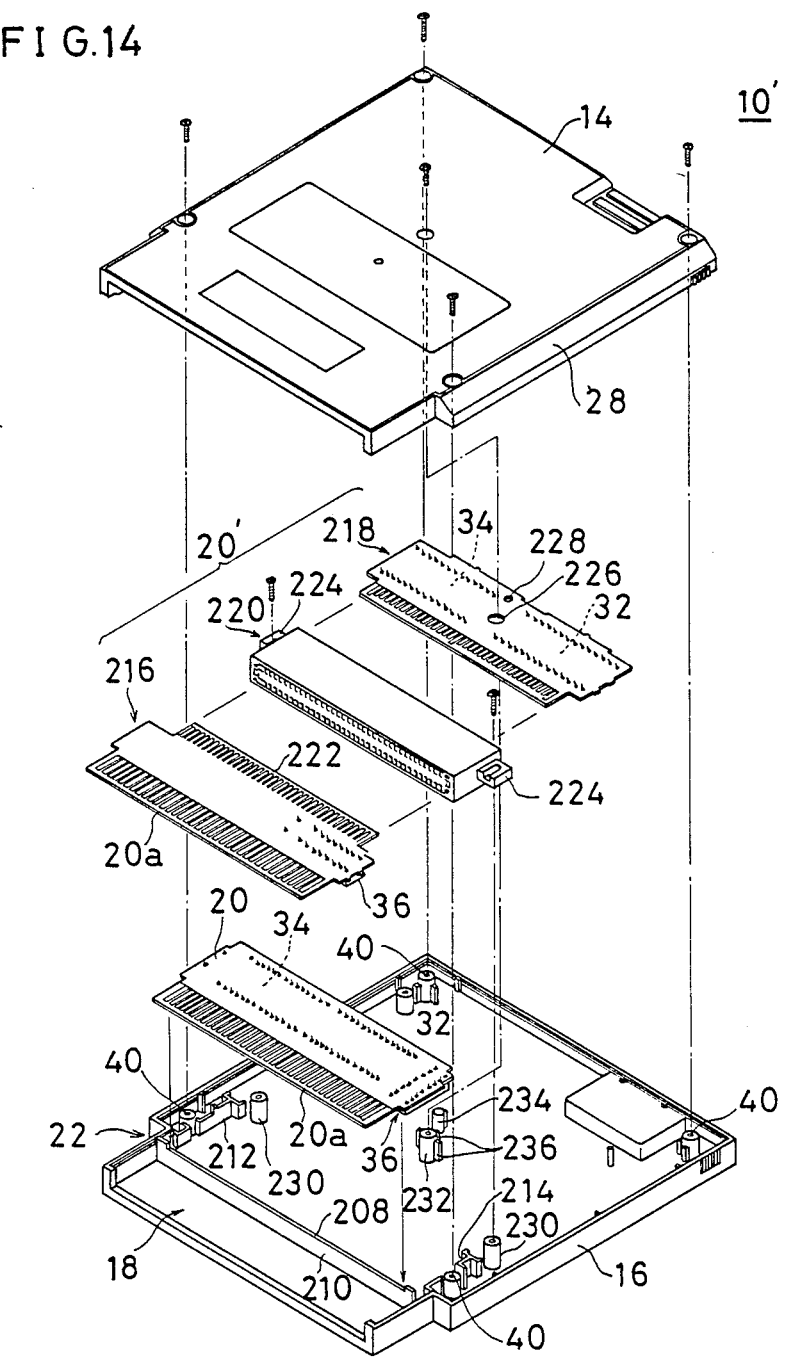

FIG. 14 is an exploded perspective view of another embodiment in accordance with the present invention. The cartridge 10' of the embodiment is modified in some respects from the embodiment shown in FIG. 1A through FIG. 2 to facilitate manufacture. More specifically, in the opening 18 of the upper half 16, a partitioning plate 210 having a notched portion 208 is formed. Also, near both sides of the partitioning plates 210, there are formed protrusions 212 and 214 for positioning. These positioning protrusions 212 and 214 are formed in an L-shape or step-shape correspondingly to the form of the both sides of the printed circuit board 20. The form and the position of the right and left sides of the positioning protrusions 212 and 214 are different from each other, thereby preventing the mounting of printed circuit board 20 in reverse in the case 12.

Meanwhile, instead of the single printed circuit board unit 20, a printed circuit board unit 20' may be used. Board unit 20' includes a first printed circuit board 215, a second printed circuit board 218 and a double edge connector 220 for interconnecting the both printed circuit board 216 and 218. The reason why such printed circuit board unit 20' is used is to make the printed circuit board 218 having no key microprocessor 36 applicable to the gaming machine main unit 42 of the embodiment shown. It will provide a cartridge 10' usable with printed circuit board 218 for another kind of game and having the number of connecting electrodes different from that of the edge connector 78. In this case, the number of the connecting electrodes formed on the tip 20a of the first printed circuit board 216 is selected equal to the number of the connecting electrodes of the printed circuit board 20 of the above described embodiment. Also the number of the connecting electrodes formed at the rear end of the first printed circuit board 216 is selected equal to the number of the connecting electrodes of the second circuit board 218. Further the key microprocessor 36 is mounted on the first printed circuit board 216. Then, the rear end of the first printed circuit board 216 is inserted into one insertion part of the double edge connector 220 and, the second printed circuit board 218 is inserted into the other insertion part of the double edge connector 220.

At the both right and left sides of the double edge connector 220, a mounting piece 224 having a mounting hole is formed. The ROMs 32 and 34 are mounted on the second printed circuit board 218. In the center of the second printed circuit board 218, a hole 226 is formed and, a hold 228 is formed at the position shifted from the hole 226.

On the other hand, in the case where the printed circuit board unit 20' is used, mounting posts 230 and 232 having threaded holes therein and positioning post 234 are formed on the upper half 16. On an outer periphery of the mounting post 232, a fin-shaped protrusion 236 is formed below the position corresponding to the thickness of the second printed circuit board 218. Therefore, the mounting of printed circuit board unit 20' is facilitated and a reverse mounting of the board is prevented. Further, by such structure, it is possible to secure stably the printed circuit board unit 20' to the case 12.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic gaming apparatus comprising:
    a main unit;
    a frame structure mounted to the main unit;
    a cartridge tray having a first end pivotally mounted to said frame structure for rotation of a second end within a predetermined angular range between a cartridge loading and a cartridge operating position, said cartridge tray including a bottom plate, a side wall, and a cartridge keying structure extending between the bottom plate and the side wall;
    means biasing said cartridge tray toward the loading position;
    means for releasably locking the tray in the operating position;
    connector means fixedly mounted in said main unit at said first end of said cartridge tray such that said cartridge tray rotates relative to said connector means; and
    a memory cartridge configured to be slideably inserted into the second end of said cartridge tray in a direction parallel to the bottom plate of said tray when said tray is in said loading position and to engage said connector means at the first end of said tray, said memory cartridge including a case having top and bottom surfaces and a side surface intersecting said top surface, and said memory cartridge further having a keyed surface intersecting the side and bottom surfaces and cooperating with said keying structure to prevent an inverted insertion of the cartridge in said cartridge tray.

2. The electronic gaming apparatus of claim 1 wherein the cartridge keying structure of said cartridge tray includes a bar having a substantially planar keying surface which intersects the bottom plate at a predetermined angle.

3. The electronic gaming apparatus of claim 2 wherein the keyed surface of said memory cartridge case includes a substantially planar chamfered surface which intersects the bottom surface at said predetermined angle.

4. The electronic gaming apparatus of claim 3, wherein said keying surface of said bar is disposed along a side of said tray so as to slideably engage, along its length, the keyed surface of said memory cartridge case when said memory cartridge is slideably inserted.

5. An electronic gaming apparatus comprising:
    a main unit;
    a frame structure mounted to the main unit;
    a cartridge tray pivotally mounted to said frame structure for rotation within a predetermined angular range between a loading and an operating position;
    means biasing said cartridge tray toward the loading position;
    means for releasably locking said cartridge tray in the operating position;
    a memory cartridge adapted to be slideably inserted into said cartridge tray when in its loading position, said memory cartridge including a case having a bottom surface, said bottom surface having a recess therein; and,
    security means for preventing the use of an unauthorized cartridge in said main unit, said security means including a protrusion extending upward from said frame member and positioned such that as the cartridge tray is rotated toward the operating position, the protrusion enters the recess on said bottom surface of said cartridge case and allows said cartridge and cartridge tray to assume the operating position.

6. The electronic gaming apparatus of claim 5, wherein said recess in said bottom surface of said cartridge case is arranged and sized to form a manually grippable end portion for facilitating cartridge insertion and removal.

7. An electronic gaming apparatus comprising:
    a main control unit;
    a frame structure mounted to the main control unit;
    a cartridge tray pivotally mounted to said frame structure for rotation within a predetermined angular range between a loading and an operating position;
    means biasing said cartridge tray toward the loading position;
    means for releasably locking said cartridge tray in the operating position;
    a memory cartridge for operation with said main control unit and being adapted to be slideably inserted into said cartridge tray when in its loading position, said memory cartridge including a case having a bottom surface, said bottom surface having a recess therein; and security means for preventing the use of an unauthorized cartridge in said main control unit, said security means including a protrusion extending upward from said frame member and positioned such that as said cartridge tray is rotated toward the operating position, the protrusion enters said recess on said cartridge and allows said cartridge tray to assume the operating position, said security means further including substantially identical first and second data processing devices mounted in said memory cartridge and said main control unit, respectively, for executing the same predetermined authenticating program to determine authenticity of said cartridge, and control means responsive to at least one of said first and second data processing devices for disabling operation of said main control unit in accordance with the execution of said authenticating program.

8. The electronic gaming apparatus of claim 7, wherein said memory cartridge comprises at least one ROM memory device mounted within said case along with said first data processing device for storing said predetermined authenticating program.

9. An electronic gaming apparatus comprising:
a main control unit;
a frame structure mounted to the main control unit;
a cartridge tray having a first end pivotally mounted to said frame structure for rotation of a second end within a predetermined angular range between a loading and an operating position, the cartridge tray having a bottom plate, a side wall, and a cartridge keying structure extending between the bottom plate and the side wall wherein the keying structure includes a substantially planar keying surface which intersects the bottom plate at a predetermined angle;
means biasing said cartridge tray toward the loading position;
means for releasably locking said cartridge tray in the operating position;
a memory cartridge for operation with said main control unit and being adapted to be slideably inserted into said cartridge tray in a direction parallel to the bottom plate at said second end when said cartridge tray is in its loading position, said memory cartridge including a case having top and bottom surfaces and a printed circuit board mounted therein having exposed edge terminals at one end of said case, said bottom surface having a recess therein at an end of said case opposite the exposed edge terminals, a side surface intersecting said top surface, and said memory cartridge further having a keyed surface intersecting the side and bottom surfaces and cooperating with said keying structure to prevent an inverted insertion of the cartridge in said cartridge tray, the keying surface including a substantially planar chamfered surface which intersects the bottom surface at said predetermined angle; and
security means for preventing the use of an unauthorized cartridge in said main unit, said security means including a protrusion extending upward from said frame member and positioned such that as said cartridge tray is rotated toward the operating position, said protrusion entering said recess on said cartridge and allowing said cartridge tray to assume the operating position, said security means further including substantially identical first and second data processing devices respectively mounted in said memory cartridge and said main control unit for executing the same predetermined authenticating program to determine authenticity of said cartridge, and control means responsive to at least one of said first and second data processing devices for disabling operation of said main control unit in accordance with said authenticating program.

10. A memory cartridge for an electronic programable gaming apparatus of the type having a cartridge receiving front loading apparatus, said memory cartridge comprising:
a printed circuit board;
a relatively flat cartridge case containing said printed circuit board and being adapted for slideable endwise insertion into and connection with a front loading apparatus, and having a connection end, a manually grippable end opposite said connection end, and top and bottom surfaces lying in substantially parallel planes and joining said connection end and grippable end, and further having first and second side surfaces joining said top and bottom surfaces, at least one of said side surfaces having a keyed surface adapted for cooperating with a front loading apparatus to prevent an inverted insertion of the cartridge therein, and said printed circuit board having a plurality of edge contacts that are substantially centered between said top and bottom surfaces and between said first and second side surfaces at said connection end so that but for said keyed surface, said cartridge and said printed circuit board therein, when inverted, would be connectable to a front loading apparatus;
game data memory means mounted on said printed circuit board for generating data that is adapted to be communicated to the electronic gaming unit via connection therewith at said plurality of edge contacts; and
data processing means mounted in said cartridge for executing a predetermined data processing program that determines authenticity of said cartridge when loaded into a front loading apparatus.

11. The memory cartridge of claim 10 further comprising a manually engageable recess at said grippable end of said case, said recess intersecting at least said bottom surface of said case and being adapted for cooperating with a registering protrusion on the front loading apparatus during loading of said cartridge to further determine authenticity of said cartridge.

12. The memory cartridge of claim 11, wherein said recess on said bottom surface of said case is sized to form a manually grippable end portion of reduced thickness between said top and bottom surfaces.

13. The cartridge of claim 11, wherein said data processing means comprises a microprocessor and a memory storing said predetermined data processing program.

14. A memory cartridge receivable in a front loading apparatus of an electronic programable gaming system, said memory cartridge comprising:
a printed circuit board;
a relatively flat cartridge case containing said printed circuit board and being adapted to slideable endwise insertion into and connection with a front loading apparatus, and having a connection end, a manually grippable end opposite said connection end, and top and bottom surfaces lying in substantially parallel planes and joining said connection end and grippable end, and further having first and second side surfaces joining said top and bottom surfaces, at least one of said side surfaces having a keyed surface adapted for cooperating with a front loading apparatus to prevent an inverted insertion of the cartridge therein, and said printed circuit board having a plurality of edge contacts that are substantially centered between said top and bottom surfaces and between said first and second side surfaces at said connection end so that but for said keyed surface, said cartridge and said printed circuit board therein when inverted, would be connectable to a front loading apparatus;

game data memory means mounted on said printed circuit board for generating data that is adapted to be communicated to the electronic gaming unit via connection therewith at said plurality of edge contacts; and said cartridge case having a recess at the manually grippable end adapted for cooperating with a protrusion on a front loading apparatus that determines authenticity of said cartridge when loading.

15. The cartridge of claim 14, wherein said recess on said cartridge case is located and sized so as to form a cartridge end portion of reduced thickness suitable for manually gripping during cartridge loading and unloading.

16. The cartridge of claim 14, wherein said keyed surface is a substantially planar chamfered surface which intersects the bottom surface and at a predetermined angle and extends lengthwise along said one of said surfaces from the connection end and toward the grippable end.

17. A memory cartridge for an electronic gaming unit having a cartridge tray pivotally mounted therein for rotation within a predetermined angular range between a cartridge loading position and a cartridge operating position, the tray including a bottom plate, side walls having offset portions, a cartridge keying structure extending between the bottom plate and one of the side walls, a low insertion force edge connector mounted near an end of the tray and a security means disposed within the gaming unit adjacent the tray to prevent the use of an unauthorized cartridge in the gaming unit, the security means including an upwardly extending protrusion, the cartridge comprising:

a case adapted to be slideably inserted into the tray and having top and bottom surfaces and side surfaces intersecting the top surface, an insertion end having an elongated opening therein and adapted to cooperate with the edge connector, a keyed surface intersecting one side surface and the bottom surface and adapted to cooperate with the keying structure in the tray to prevent an inverted insertion of the cartridge in the tray, the bottom surface of the case including a recess disposed adjacent an end of the cartridge case opposite the insertion end and having a sufficient depth to accommodate the protrusion on the gaming unit when the tray is rotated into the operating position;

a printed circuit board mounted within the case and having an insertion edge positioned within said opening at the insertion end of the case midway between the top and bottom surfaces and centered between the side surfaces, a plurality of electrical contacts disposed along the insertion edge and adapted for electrical interconnection with the edge connector; and game data memory means mounted in said cartridge for generating data to be communicated to the gaming unit through the electrical contacts and the edge connector.

18. The memory cartridge of claim 17 wherein the cartridge keying structure of the gaming unit includes a bar having a substantially planar keying surface which intersects the bottom plate at a predetermined angle, and wherein said keyed surface of said cartridge case includes a substantially planar chamfered surface which intersects the bottom surface of the cartridge at the same predetermined angle.

19. The memory cartridge of claim 17 wherein said recess in the bottom surface of said cartridge case extends into an end surface opposite said insertion end and includes gripping means to facilitate removal of the cartridge from the tray.

20. The memory cartridge of claim 17 wherein said side surfaces include an offset section adjacent the insertion end which cooperate with the offset portions of the side walls of the tray to limit the insertion of the cartridge into the tray.

21. A memory cartridge for an electronic gaming unit of the type having a cartridge tray pivotally mounted therein for rotation within a predetermined angular range between a cartridge loading position and a cartridge operating position, the tray including a bottom plate, a side wall having an offset portion, a cartridge keying structure extending between the bottom plate and the side wall, the keying structure including a bar having a substantially planar keying surface which intersects the bottom plate at a predetermined angle, a low insertion force edge connector mounted near an end of the tray and security means disposed within the gaming unit adjacent the tray to prevent the use of an unauthorized cartridge in the main unit, the security means including an upwardly extending cylindrical protrusion, the cartridge comprising:

a case adapted to be slideably inserted into the tray and having top, bottom and side surfaces, one side surface intersecting the top surface and including an offset section which cooperates with the offset portion of the side wall of the tray to limit the insertion of the cartridge into the tray, an insertion end of said case having an elongated opening therein and adapted to engagably receive the edge connector, said case having a keyed surface intersecting the side and bottom surfaces and cooperating with the keying structure in the tray to prevent an inverted insertion of the cartridge in the tray wherein the case keyed surface includes a substantially planar chamfer which intersects the bottom surface at said predetermined angle, the bottom surface including a recess disposed adjacent and extending into an end of the cartridge case opposite said insertion end, said recess including gripping means to facilitate removal of the cartridge from the tray and having a sufficient depth to accommodate the security means protrusion when the tray is rotated into the operating position;

a printed circuit board mounted within the cartridge case and having an insertion edge positioned within said opening at the insertion end of the case midway between the top and bottom surfaces, a plurality of electrical contacts disposed along the insertion edge and adapted for electrical interconnection with the edge connector; and game data memory means mounted on the circuit board for generating data to be communicated to the game machine through the electrical contacts and the edge connector.

22. The memory cartridge of claim 21, further comprising data processing means mounted in said cartridge for executing a predetermined data processing program in synchronism with a like data processing means in the gaming unit that determines authenticity of said cartridge when loaded into the gaming unit.

* * * * *

UNITED STATES PATENT AND TRADEMARK OFFICE
CERTIFICATE OF CORRECTION

PATENT NO. : 4,865,321
DATED : September 12, 1989
INVENTOR(S) : NAKAGAWA et al

It is certified that error appears in the above-identified patent and that said Letters Patent is hereby corrected as shown below:

Column 1, line 60, delete "prsent" and insert --present--.

Column 2, line 2, after "game," insert --and--.

Column 4, line 19, delete "if" and insert --in--.

Column 5, line 50, change "wllls" to --walls--.

Column 6, lines 23 and 27, change "pieced" to --pieces--;
       line 34, delete "presents" and insert --prevents--.

Column 11, line 15, delete "in" and insert --is--.

Column 12, line 44, delete "fro mthe" and insert --from the--.

Column 14, line 4, delete "ans" and insert --and--
       line 32, delete "26" and insert --36--.

Column 18, line 68, delete "to" and insert --for--.

Signed and Sealed this

Seventh Day of August, 1990

Attest:

HARRY F. MANBECK, JR.

*Attesting Officer*  *Commissioner of Patents and Trademarks*